United States Patent [19]
Corriveau et al.

[11] Patent Number: 6,141,544
[45] Date of Patent: Oct. 31, 2000

[54] SYSTEM AND METHOD FOR OVER THE AIR ACTIVATION IN A WIRELESS TELECOMMUNICATIONS NETWORK

[75] Inventors: Michel Corriveau, St-Hubert; Michel Houde, St-Laurent, both of Canada

[73] Assignee: Telefonaktiebolaget LM Ericsson, Stockholm, Sweden

[21] Appl. No.: 09/201,534

[22] Filed: Nov. 30, 1998

[51] Int. Cl.[7] .................................. H04M 1/66; G07D 7/00
[52] U.S. Cl. ...................... 455/411; 455/410; 340/825.34; 380/248
[58] Field of Search ........................ 340/825.34; 713/200; 455/418, 419, 420, 410, 411; 380/247, 248, 249

[56] References Cited

U.S. PATENT DOCUMENTS

| | | | |
|---|---|---|---|
| 5,077,790 | 12/1991 | D'Amico et al. | 380/23 |
| 5,153,919 | 10/1992 | Reeds, III et al. | 380/44 |
| 5,204,902 | 4/1993 | Reeds, III et al. | 380/23 |
| 5,455,863 | 10/1995 | Brown et al. | |
| 5,553,315 | 9/1996 | Sobti et al. | 455/56.1 |
| 5,613,214 | 3/1997 | Shirasawa et al. | 455/411 |
| 5,642,401 | 6/1997 | Yahagi | 455/411 |
| 5,661,806 | 8/1997 | Nevoux et al. | 380/25 |
| 5,668,876 | 9/1997 | Falk et al. | 380/25 |
| 5,722,084 | 2/1998 | Chakrin et al. | 455/551 |
| 5,754,952 | 5/1998 | Hodges et al. | |
| 5,799,084 | 8/1998 | Gallagher et al. | 380/23 |
| 5,875,394 | 2/1999 | Daly et al. | 455/411 |
| 5,943,425 | 8/1999 | Mizikovsky | 380/25 |
| 6,008,737 | 12/1999 | Deluca et al. | 340/825.34 |
| 6,047,071 | 4/2000 | Shah | 380/273 |

FOREIGN PATENT DOCUMENTS

| | | |
|---|---|---|
| 0 532 227 | 9/1992 | European Pat. Off. . |
| WO 97/08905 | 3/1997 | WIPO . |
| WO 98/41044 | 9/1998 | WIPO . |

*Primary Examiner*—Nguyen Vo
*Assistant Examiner*—Charles N. Appiah
*Attorney, Agent, or Firm*—Jenkens & Gilchrist P.C.

[57] ABSTRACT

There is disclosed a system and method for over the air (OTA) activation of a mobile station in a wireless telecommunications network. During activation, a network OTA processor requests the data configuration of the mobile station. The mobile station may issue a challenge the OTA processor and in so doing transmits a challenge message including certain mobile station parameters and a code lock indicator to the OTA processor. The OTA activation processor determines if a new or first code lock parameter has been forwarded to the OTA activation processor by the network for the code lock indicator. If so, the OTA activation processor includes the first code lock parameter in a challenge message forwarded to the authentication center for processing a response to be validated by the mobile station. If not, the OTA activator forwards the challenge message to the home location register that has previously stored the code lock parameter. The home location register substitutes the stored code lock parameter for the code lock indicator and forwards the challenge message so revised to the authentication center for processing. The authentication center uses a code lock parameter comprising one of the Shared Secret Data Challenge (SSD_C) and Shared Secret Data Subsidy (SSD_S) security locks. The OTA activation processor is capable of instructing the authentication center to generate new code lock parameters and instructing the home location register to commit to these new operating parameter.

28 Claims, 6 Drawing Sheets

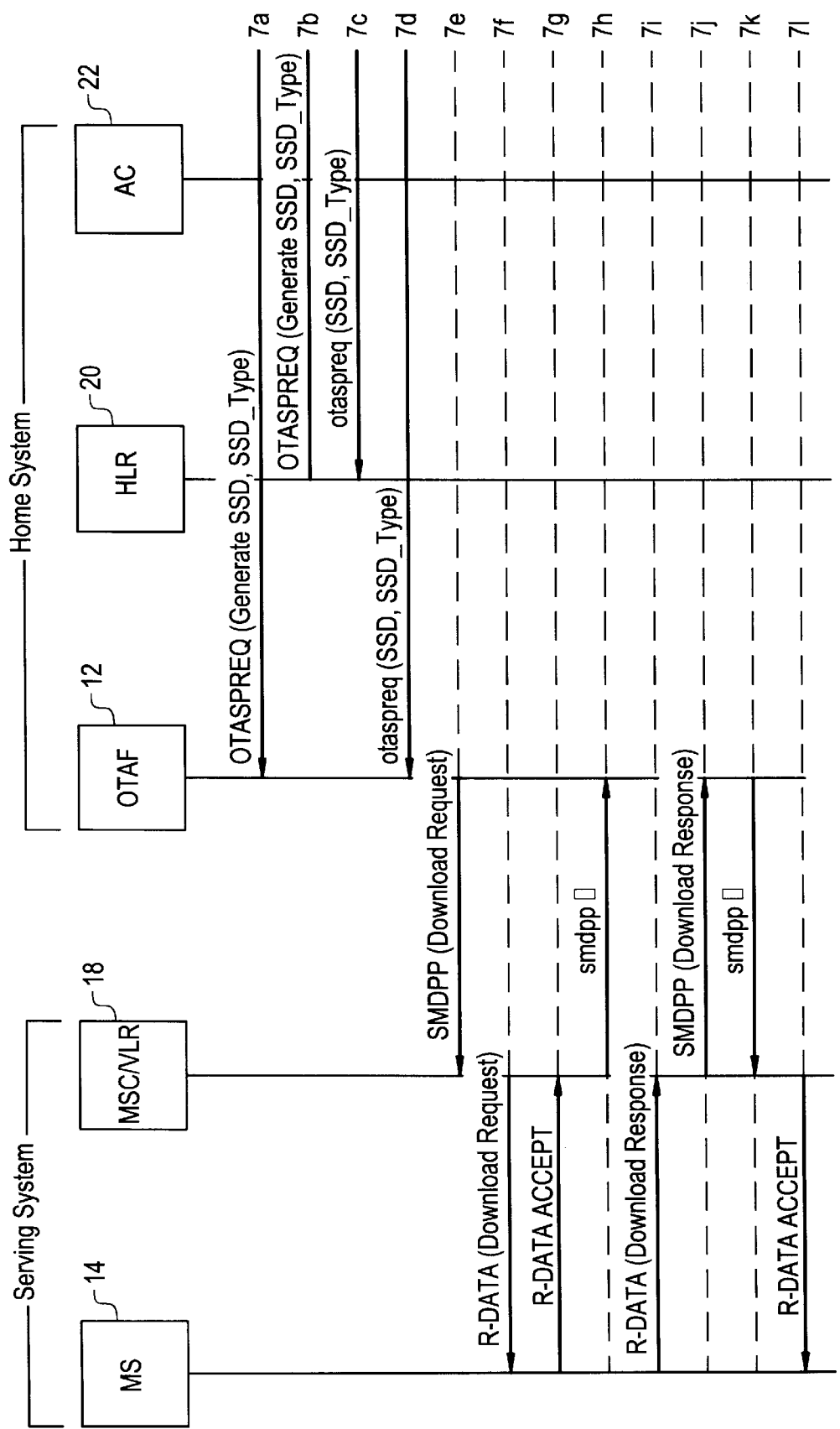

SYSTEM AND METHOD FOR OVER THE AIR ACTIVATION IN A WIRELESS TELECOMMUNICATIONS NETWORK

RELATED CO-PENDING APPLICATION

The present application is related to co-pending application Ser. No. 09/160,369, filed on Sep. 24, 1998, entitled "System and Method for a Previously Activated Mobile Station to Challenge Network Mobile Station Knowledge During Over the Air Activation", for same the inventors as named herein.

FIELD OF THE INVENTION

The present invention relates to over the air activation (OTA) of a mobile station in a wireless telecommunications network. In particular it relates to the mobile station challenging the network's knowledge of the mobile station's operating parameters prior to the mobile station permitting the activation to continue, and to the generation and storage of new code lock parameters.

BACKGROUND OF THE INVENTION

It should be understood that the term "mobile station" used throughout the specification includes mobile telecommunications units that communicate with a base station in a wireless telecommunications network by means of electromagnetic waves such as mobile wireless telephones and cellular telephone that are designed to exchange voice information with a base station. The term includes mobile data communication devices such as pagers and facsimile machines for exchanging data. The term mobile station also includes hybrid devices such as personal communications systems (PCS) that have both telephone and data communications features.

New digital cellular systems, commonly known as Personal Communications Systems (PCS) have recently been introduced in North America. PCS operates at a frequency band of about 1850 to 1990 Mhz so as not to interfere with the existing cellular frequency band of about 800 to 900 Mhz. PCS provides enhanced features compared to existing cellular systems, such as short message service (SMS), voice mail, call forwarding, over the air activation (OTA), and other features. There are also digital cellular telephones operating under CDMA digital systems and further digital systems operating at 800 Mhz frequency.

Digital mobile stations can be activated over the air using short message service. A purchaser of a mobile station can leave the store without having the phone activated. When the mobile station is turned on by the purchaser, the mobile station sends a registration message with an inactive MIN (mobile identity number) to the serving mobile switching center serving the mobile station. The MSC recognizes the mobile station as a non-programmed mobile station and routes the message to the over the air activation processor. The information forwarded to the over the air activation processor further includes additional information contained in the registration message such as the electronic serial number (ESN) of the mobile station. This allows the over the air activation processor to assign the activation parameters to the mobile station and send these parameters back to the mobile station using the inactive MIN. These activation parameters typically include the number assignment module (NAM) designation parameters. The NAM parameters typically include the system identification, telephone number, access overhead class, group identification, initial paging channel, security lock code, local use flag, A/B system selection, and new mobile identity number (MIN).

To protect the subscriber or mobile station from being activated with incorrect information from a third party operator, a security lock code, known to the home operator, is assigned to the mobile station. When a mobile is requested to provide information of its NAM or to download its NAM, the mobile station requests a challenge of the network for the network to supply knowledge of the mobile station's security lock before allowing the new activation parameters to be read or downloaded. However, within the network there does not presently exist any mechanism to generate and permanently store new security lock code information in the network to be used in subsequent over the air activations of the mobile station. Accordingly, there is a need for a standard implementation that permits for generation and storage of new security lock code information within the network.

SUMMARY OF THE INVENTION

The present invention overcomes the disadvantages associated with current over the air activation in a wireless telecommunications network by providing a method and system within the network that responds to the mobile station's challenge request prior to permitting the reading or downloading of new operating parameters using the over the air activation processor. The mobile station challenge request includes certain mobile station identifying and operating parameters. The wireless network generates a return challenge response message from the certain parameters transmitted and forwards the return challenge response message to the mobile station for validation. The return challenge response message demonstrates to the mobile station that the network requesting the over the air activation has knowledge of security lock information previously programmed into the mobile station. Once the mobile station validates the return challenge response message, the mobile station then allows the network to read information from the mobile station or modify the mobile station NAM parameters. During this over the air activation, the network generates new security lock information and downloads the new security lock information to the mobile station. The network stores the security lock information for subsequent over the air activation challenges by the mobile station.

It should be understood that the over the air activation of a new or a previously activated mobile is required by the network to download new or revised information to the mobile station relating to the mobile telephone number in the mobile station, a service provided to the mobile station or an upgrade to the mobile station to function with a corresponding upgrade change in the network.

In particular, the present invention utilizes the over the air activation processor to determine if a new or first code lock parameter has been forwarded to the over the air activation processor by the network for activation of a new mobile subscriber to the network. If the mobile station is a new subscriber, the over the air activation processor includes the first code lock parameter in a challenge request message forwarded to the authentication center for processing a response to be validated by the mobile station. If the over the air activation processor does not have a first code lock parameter, the over the air activator forwards the challenge request message to a predetermined node in the network that has previously stored the code lock parameter associated with the code lock indicator for the mobile station. This node, preferably the home location register, substitutes the stored code lock parameter for the code lock indicator and forwards the challenge request message so revised to the authentication center for processing.

The over the air activation processor during the activation process instructs a node, preferably the authentication center, to generate new code lock indicators for downloading to the mobile station. The over the air activation processor also instructs a node in the network, preferably the home location register, to store the newly generated security lock code for subsequent over the air activations.

In accordance with the invention the certain parameters transmitted by the mobile station in the challenge to the over the air activation request preferably include the mobile identification number (MIN) or international mobile identification number (ISMI), electronic serial number (ESN), challenge request activation code, the service code identity and the Shared Secret Data Select (SSD_Select) indicator parameter. The last parameter is sent to the network to identify which security lock code parameter of the mobile station is to be used by the network in the generation of the return challenge response message. These security lock codes or parameters are preferably either the Shared Secret Data Challenge (SSD_C) parameter or the Shared Secret Data Subsidy (SSD_S) parameter. It should be understood that these security parameters are not broadcast by the mobile station and the network is required to store these security parameters and use one of them in conjunction with the other broadcast parameters in the challenge request to generate a challenge request return message which includes a calculated value to be compared with an identical calculated value already calculated by the mobile station.

In accordance with an aspect of the present invention there is provided a wireless communications network system for activating over the air (OTA) a mobile station, comprising:

an over the air processor for activating the mobile station and for receiving from the mobile station a first challenge request message of the activation that includes certain mobile station parameters and a code lock indicator, the over the air processor determining if a first code lock parameter corresponding to the code lock indicator has been received from the network and in the event the first code lock parameter has been received, the over the air processor replacing the code lock indicator with the first code lock parameter and forwarding the first challenge request message including the certain mobile station parameters and the first code lock parameter to the authentication center, and, in the event the over the air processor has not received the code lock parameter, the over the air processor forwarding the first challenge request message including the certain mobile station parameters and the code lock indicator to a first predetermined node in the network;

the first predetermined node upon receipt of the first challenge request message including the code lock indicator, replacing the code lock indicator with a stored code lock parameter stored in the predetermined node for the mobile station and corresponding to the code lock indicator, and the first predetermined node forwarding the first challenge request message including the certain mobile station parameters and the stored code lock parameter to the authentication center; and, the authentication center upon receipt of the first challenge request message using the certain mobile station parameters and a forwarded one of the first code lock parameter and stored code lock parameter to generate a return challenge response message and forwarding the return challenge response message to the over the air processor and onto the mobile station for validation.

It is envisaged that the first predetermined node is a node selected from the group consisting of the over the air processor, a home location register, the authentication center and a co-located home location register and authentication center. Preferably, the first predetermined node is the home location center. During the over the air activation process, it is envisaged that the over the air activation processor sends a commit message to this first predetermined node to store a new code lock parameter.

It is also envisaged that the over the air processor sends a code lock generating message to a second predetermined node in the network selected from the group consisting of the over the air processor, the home location register, the authentication center and the co-located home location register. The second predetermined node generates a new code lock parameter for the mobile station which is downloaded to the mobile station when the over the air processor sends new programming information to the mobile station to activate the mobile station with new operating parameters. The second predetermined node is preferably the authentication center.

In accordance with another aspect of the present invention there is provided a method for activating over the air (OTA) a mobile station in a wireless communications network including an over the air processor, and an authentication center, the method comprising the steps of:

i) the over the air processor requesting the data configuration of the mobile station;

ii) the mobile station making a first challenge request of the request for data configuration information and transmitting certain mobile station parameters to the over the air processor including a code lock indicator;

iii) the over the air processor upon receipt of the first challenge request determining if a first code lock parameter corresponding to the code lock indicator has been received from the network and in the event the first code lock parameter has been received, the over the air processor replacing the code lock indicator with the first code lock parameter and forwarding the first challenge request including the certain mobile station parameters and the first code lock parameter to the authentication center, and, in the event the over the air processor has not received the code lock parameter, the over the air processor forwarding the first challenge request including the certain mobile station parameters and the code lock indicator to a first predetermined node in the network;

iv) the first predetermined node upon receipt of the first challenge request including the code lock indicator, replacing the code lock indicator with a stored code lock parameter stored in the predetermined node for the mobile station and corresponding to the code lock indicator, and the first predetermined node forwarding the first challenge request including the certain mobile station parameters and the stored code lock parameter to the authentication center;

v) the authentication center upon receipt of the first challenge request using the certain mobile station parameters and a forwarded one of the first code lock parameter and stored code lock parameter to generate a return challenge response and forwarding the return challenge response to the over the air processor and onto the mobile station;

vi) the mobile station validating the return challenge request response and forwarding data configuration information to the over the air processor in response to the authorization command; and, vii) the over the air processor sending new programming information to the mobile station to activate the mobile station with new operating parameters.

BRIEF DESCRIPTION OF THE DRAWINGS

For a better understanding of the nature and objects of the present invention reference may be made to the accompanying diagrammatic drawings in which.

DETAILED DESCRIPTION OF THE DRAWINGS

Figure 1:
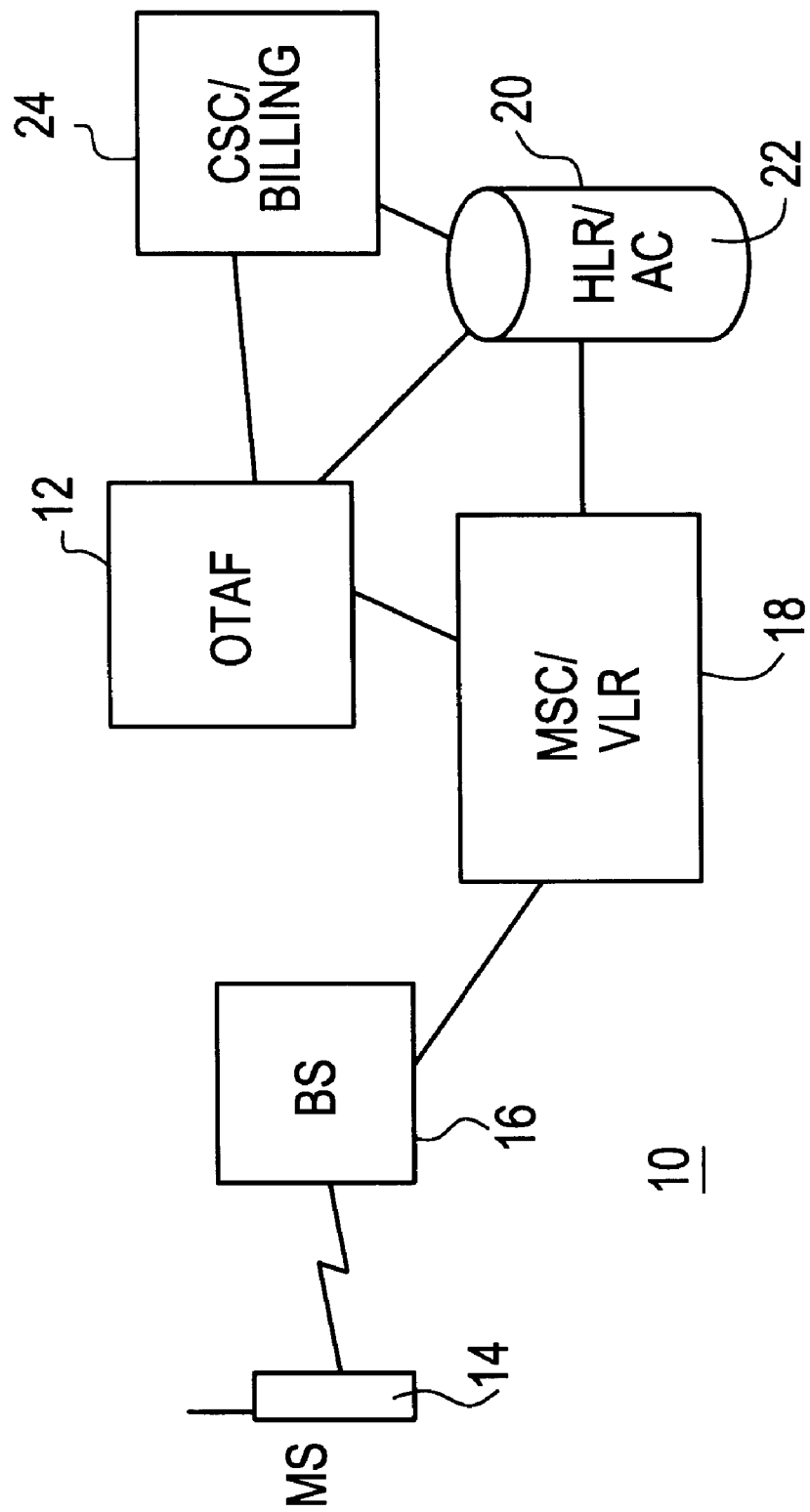
FIG. 1 is a simplified diagram of a wireless telecommunications network including an over the air activation processor.

Reference is now made to FIG. 1 wherein there is shown a simplified diagram of a wireless telecommunications network 10 including the over the air activation processor or function processor (OTAF) 12. The mobile station (MS) 14 communicates over-the-air with the local base station (BS) 16, using the IS 136 standard. This standard is documented in TIA IS-136 Revision A, Mar. 21, 1996. The base station 16 is connected to the mobile switching center (MSC) 18. The MSC 18 is shown as co-located with the visiting location register (VLR). The MSC 18 communicates over the fixed supporting network with either the home location register (HLR) 20, or alternately to the over-the-air activation function processor 12. The HLR 20 is shown to be co-located with the authentication center (AC) 22. It should be understood that either the home location register or the authentication center may be located at a separate node if desired. It should also be understood that the any node, including the MSC 18, may communicate with any other node, including the OTAF processor 12, via an intermediate signal transfer point (STP) node. Also shown in FIG. 1 is a customer service activation center (CSC) 24 which includes billing systems and which is connected in the fixed supporting network to the OTAF processor 12 and to the HLR 20 and authentication center 22. Communications between the MSC 18 and the OTAF processor 12, the HLR 20 and the authentication center 22 are carried out in accordance with IS-41 or ANSI-41 standard protocol.

The mobile stations 14 are pre-programmed with information parameters at the time of their initial activation. These parameters include the number assignment module (NAM) designation parameters. The NAM parameters typically include the system identification, telephone number, access overhead class, group identification, initial paging channel, security lock code, local use flag, A/B system selection, and mobile identity number (MIN) or the international mobile identification number (IMSI). The activation parameters further include code lock parameters Shared Secret Data (SSDs) comprising Shared Secret Data Challenge (SSD_C) and Shared Secret Data Subsidy (SSD_S) parameters.

The shared secret parameters are defined in the IS 136 standard. The Shared Secret Data_Challenge (SSD_C) parameter is used to optionally challenge the authority of the network, or a customer service center in the network, to perform the NAM write/update, or to request configuration data. This may be programmed to a non zero value either at the manufacture, or at initial Over the Air Activation. The Shared Secret Data_Subsidy (SSD_S) parameter is used in the protection of the subsidy of an MS. The mechanism for initial programming of SSD_S is vendor specific. SSD_S can only be overwritten during OTA function if previously set to non-zero. If SSD_S is non zero, SSD_C is not used.

Figure 2:
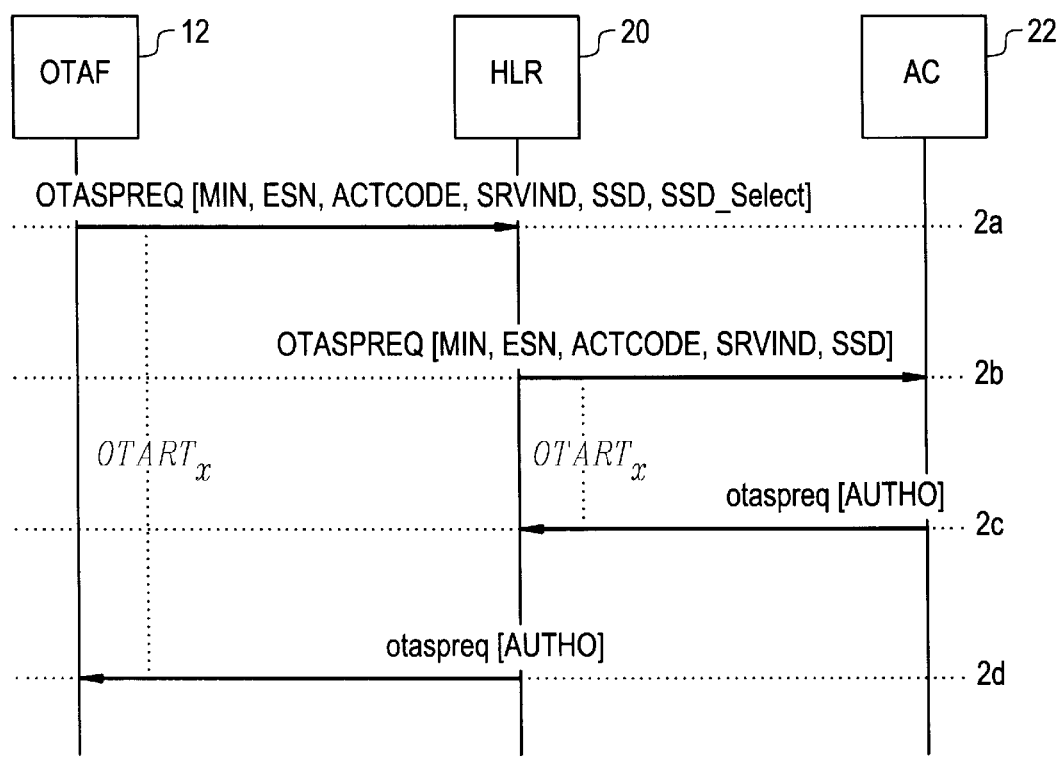
FIG. 2 is a message flow diagram illustrating the method for selecting the appropriate code lock parameter in an activation session.

Referring to FIG. 2, in order for the network to perform a challenge request from the MS 14 to the OTAF processor 12, the network needs to carry towards the AC 22, a new message, OTASPREQ (line 2a), containing the MIN, ESN, ACTCODE=CSC Challenge, SRVIND, and one of two possible MS 14 preprogrammed parameters, SSD or SSD_Select, that can be authenticated by the AC 22. Preferably this new message is routed from the OTAF processor 12 to the HLR 20 and then onto the AC 22. When the OTAF processor 16 is performing a first activation for MS 14, the SSD parameter is forwarded from a node in the network, such as, for example, the Customer Service Center 24 to the OTAF processor. The OTAF processor 12 includes the SSD parameter in the OTASPREQ message that is passed through the HLR 20 (line 2a) to the AC 22 (line 2b). When the OTAF 12 is performing a re-activation or subsequent activation of the MS 14, the OTAF processor 12 does not receive an SSD parameter from the network and the OTAF processor 12 forwards the SSD_Select parameter to the HLR 20 at line 2a. The HLR replaces the SSD_Select with the appropriate SSD stored code lock parameter and forwards the OTASREQ message so modified to the AC 22 (line 2b). The AC 22 performs the challenge request and returns the result otaspreq(AUTHO) to the HLR 20 (line 2c) which in turn returns this result to the OTAF processor 12 (line 2d). After validation of this result by the MS 14, the OTAF processor is in the position to download new MS 14 user parameters including new SSD parameters.

Figure 3:
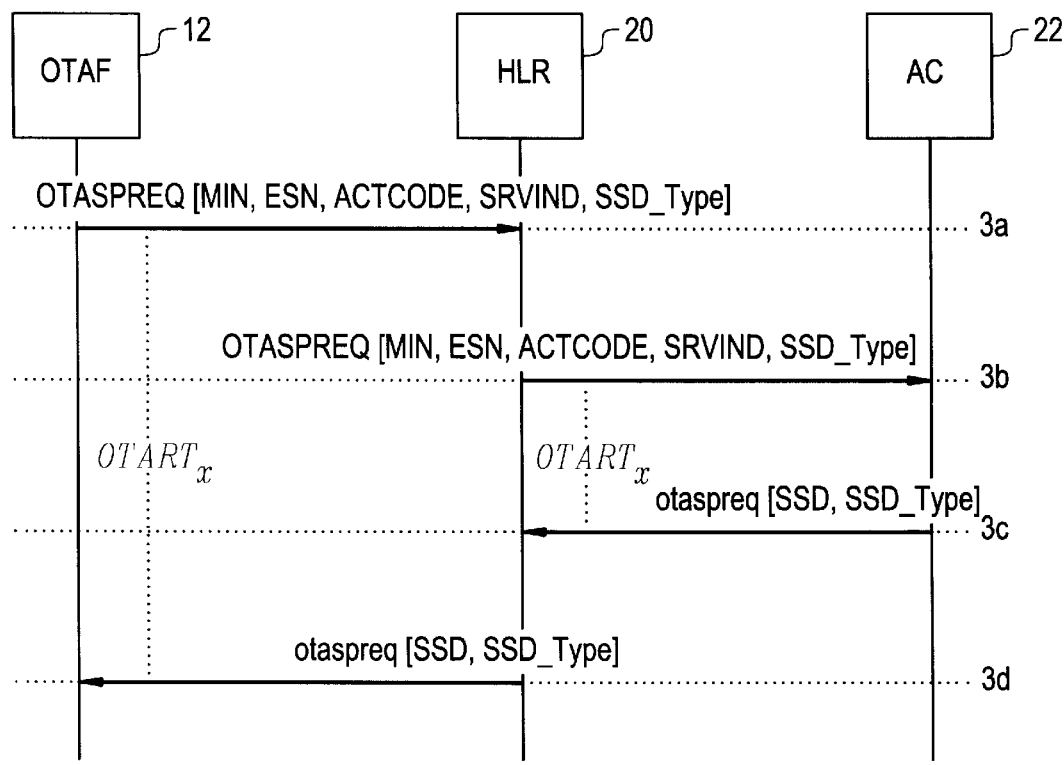
FIG. 3 is a message flow diagram illustrating the method for generating a new code lock parameter in the network.
Figure 4:
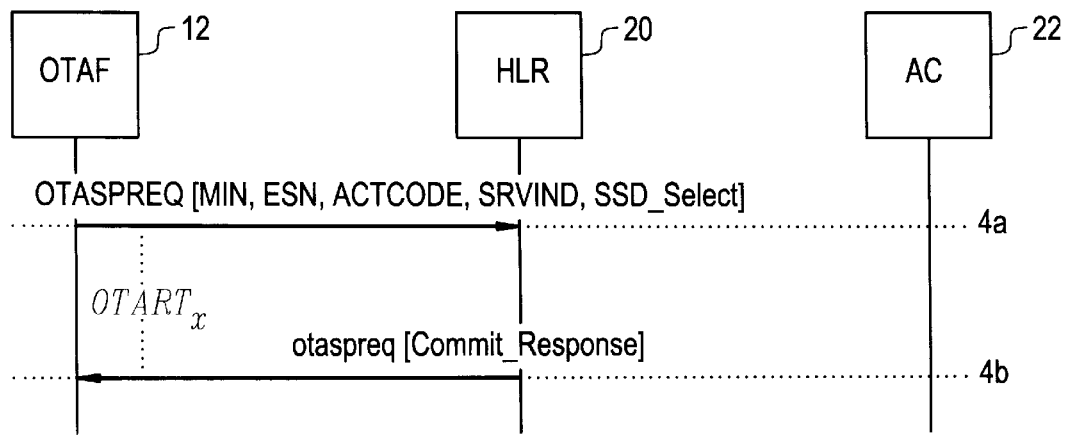
FIG. 4 is a message flow diagram illustrating the method for storing the newly generated code lock parameter in the network.

During the OTAF processor 12 activation session the OTAF processor 12 may generate two additional OTASPREQ messages as seen in FIGS. 3 and 4.

In FIG. 3, the OTAF processor 12 generates a OTASPREQ message that includes the MIN, ESN, ACTCODE, SRVIND and SSD_Type. This line is forwarded at line 3a to the HLR 20. The ACTCODE is set to request the AC 22 to generate a new SSD parameter. The SSD parameter to be generated is defined by parameter SSD_Type in the message with indicates whether the AC 22 is to generate an SSD_C or SSD_S code lock parameter. This OTASPREQ message is forwarded by the HLR 20 to the AC 22 at line 3b. The AC 22 generates the new SSD message and returns the message otaspreq at line 3c to the HLR 20 and onto the OTAF processor 12 at line 3d. The otaspreq message of FIG. 3 includes the parameter SSD (i.e. SSD_S or SSD_C) and an indicator, $SSD_{13}$ Type, of which parameter SSD_S or SSD_C has been generated. This new SSD parameter can be downloaded to the MS 14 during the activation session at the OTAF processor 12.

Referring to FIG. 4, the OTAF processor 12 then sends a new OTASPREQ message at line 4a to the HLR 20. This message includes the parameters MIN, ESN, ACTCODE, SRVIND, and SSD_Select. The ACTCODE instructs the HLR 20 to store the SSD returned in FIG. 3 line 3c and the SSD_Select instructs the HLR 20 which of the SSD parameters is being stored. In this manner, the HLR 20 has stored the SSD parameter to be used in a subsequent OTAF session.

Figure 5:
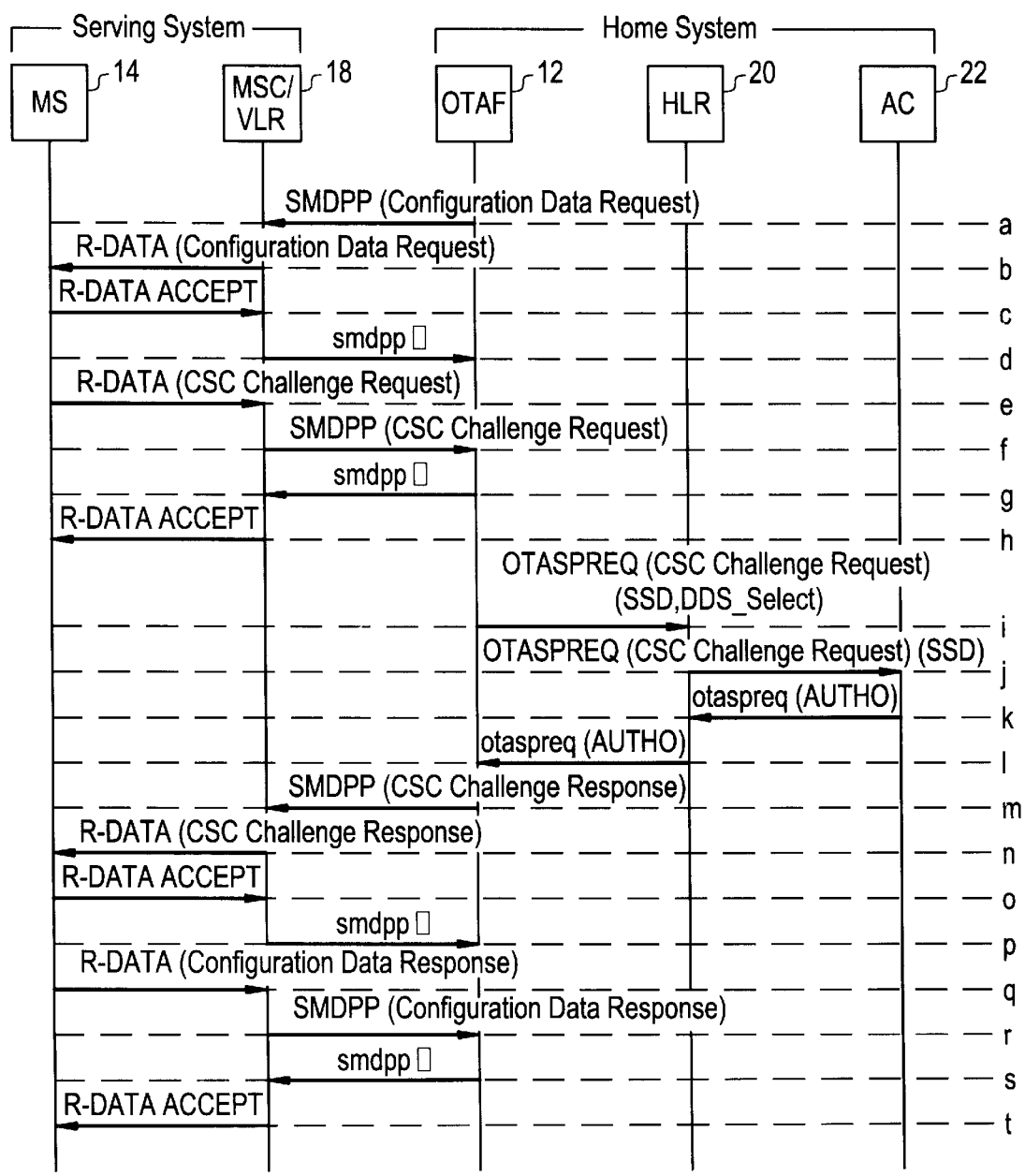
FIG. 5 is a message flow diagram illustrating the method for requesting operating parameter information from the mobile station.
Figure 6:
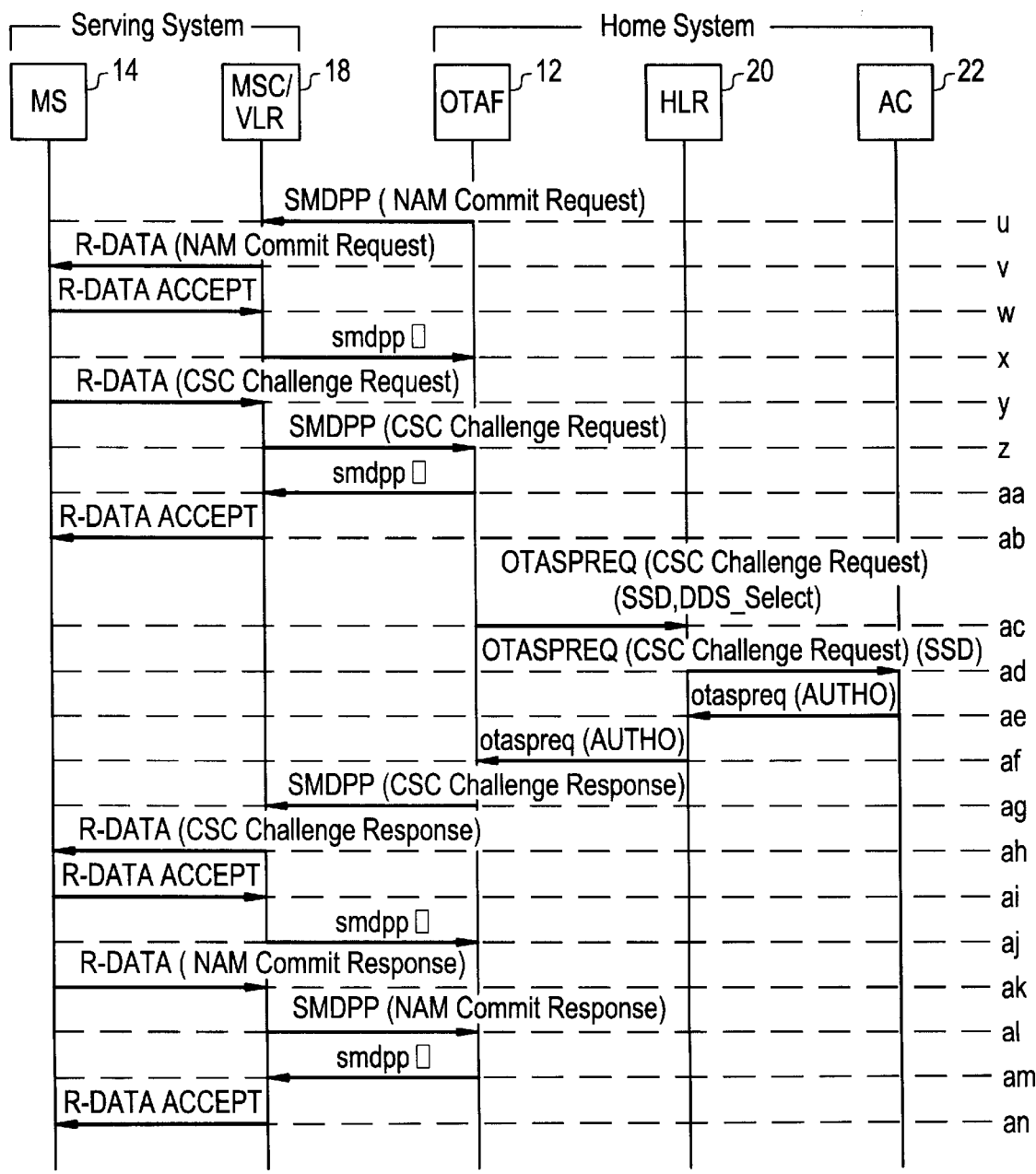
FIG. 6 is a message flow diagram illustrating the method of downloading a commit of operating parameter information to the mobile station; and, FIG. 7 is a message flow diagram illustrating the method of generating a new code lock parameter in the network during the processing of the mobile challenge request during activation.

Referring to FIGS. 5 and 6 a description of the activation of a MS 14 and the use of the OTASPREQ during this process is described.

When the customer center 24 makes a request of the subscriber to have the previously activated MS 14 activated with new NAM parameters, the customer center forwards this information to the OTAF processor 12. The OTAF processor requests the MSC address that is currently serving the mobile to the HLR (not shown). Upon reception of the MSC address, the OTAF starts the OTA procedure. Broken line a of FIG. 5 shows the OTAF processor requesting the data configuration of the mobile station 14 by sending a SMDPP message to the MSC/VLR with the following parameter: Configuration DATA Block MAP. The MSC/VLR 18 forwards the request to the mobile station 14 (broken line b).

The mobile station 14 acknowledges the reception of the request (broken line c) and this acknowledgment is forwarded by the MSC/VLR 18 to the OTAF processor 12 (broken line d).

The mobile station 14 decides to challenge the OTAF processor 12 to insure that it is authorized to request its data configuration. The mobile station 14 sends a CSC Challenge Request message to the OTAF processor 12 using R-DATA with the following parameters: SSD_Select, a randomly generated number (RANDO), MSID Type, MSID (broken line e). The MSC/VLR 18 forwards the CSC Challenge Request to the OTAF processor 12 (broken line f), the OTAF processor 12 acknowledges the reception of the request (broken line g) and the MSC/VLR 18 forwards the acknowledgment to the mobile station 14 (broken line h).

The OTAF processor 12 next sends an OTASPREQ message to the HLR 20 to perform the CSC challenge requested by the mobile station 14 (broken line i). The message contains the following parameters. Action Code set to CSC Challenge to request the AC to perform a CSC Challenge. An activation MIN (preprogrammed into the MS from the manufacturer) or a real MIN (previously programmed into the MS either by the CSC or from a previous OTA session). The mobile station's ESN, MSID Type, SRVIND (service indicator) set to TDMA OTASP value, for example, the RANDO and the SSD or the SSD_Select parameter to indicate which SSD or which SSD to use (either SSD_C or SSD_S). The selected SSD is included only if the currently used SSD by the mobile is not yet stored in the HLR. The OTAF processor 12 knows that information since the SSD(s) are provided at the initiation of the OTAF session by the node that currently stores it (such as a customer service center). The HLR 20 forwards the request to the AC 22 (broken line j). If the SSD is not provided by the OTAF, the HLR 22 includes the permanent SSD that is currently stored in the HLR record, based on the SSD_Select received in the request.

The AC 22 performs the CSC Challenge and returns the result to the OTAF processor 12. The AC 22 sends the otaspreq message to the HLR 20 with the following parameter: AUTHO (broken line k). The AUTHO parameter is the return challenge response by the AC 22 to the CSC Challenge. The return challenge response is a calculated value using the certain parameters transmitted by the MS and the security lock code parameter stored in the AC 22 and identified in the MS transmission by the SSD_Select parameter. The HLR 20 forwards the CSC Challenge Result to the OTAF processor 12 (broken line l), the OTAF processor 12 forwards the CSC Challenge Result to the MSC/VLR 18 (broken line m), and the MSC/VLR 18 forwards the CSC Challenge Result to the mobile station 14 (broken line n). The mobile station 14 acknowledges the reception of the CSC Challenge Result (broken line o) and the MSC/VLR 18 forwards the CSC Challenge Result acknowledgment to the OTAF processor 12 (broken line p).

The MS 16 compares the AUTHO response with the one already calculated in the MS. If a successful comparison in the MS results, then the mobile station 14 sends the requested configuration data to the OTAF processor 12 using R-DATA with the following parameters: NAM Configuration Data Block, Non Public Configuration Data Block, system operator code (SOC), Index Code (broken line q).

The MSC/VLR 18 forwards the configuration data to the OTAF processor 12 (broken line r) and the OTAF processor 12 acknowledges the reception of the configuration data (broken line s). The MSC/VLR 18 forwards the acknowledgment to the mobile station 14 (broken line t).

At this stage the OTAF processor 12 is able to download new operating parameters to the MS 14 to re-activate the MS 14.

Referring to FIG. 6, the OTAF processor 12 downloads the new data to the mobile station 14 using 1 or many SMDPP/smdpp messages to the mobile station 14. When the Download of the data is completed, the OTAF processor 12 requests the mobile station 14 to commit to the data downloaded to it. The OTAF processor 12 sends a SMDPP message with a NAM Commit Request to the MSC/VLR 18 (broken line u). The MSC/VLR 18 forwards the request to the mobile station 14 (broken line v). The mobile station 14 acknowledges the reception of the request (broken line w). The MSC/VLR 18 forwards the acknowledgment to the OTAF processor 12 (broken line x).

The mobile station 14 decides to challenge the OTAF processor 12 to insure that it is authorized to commit its NAM with the Downloaded Configuration Data. The mobile station 14 sends a CSC Challenge Request to the OTAF processor 12 using R-DATA with the following parameters: SSD_Select, RANDO, MSID Type, MSID (broken line y).

The MSC/VLR 18 forwards the CSC Challenge Request to the OTAF processor 12 (broken line z). The OTAF processor 12 acknowledges the reception of the request (broken line aa). The MSC/VLR 18 forwards the acknowledgment to the mobile station 14 (broken line ab).

The OTAF processor 12 then sends an OTASPREQ message to the HLR 20 to perform the CSC challenge requested by the mobile station 14. The message contains the following parameters: Action Code=CSC Challenge, RANDO, MSID Type, MSID; and the SSD_Select indicator parameter (broken line ac). The HLR 20 forwards the request to the AC 22 (broken line ad) and the AC 22 performs the CSC Challenge and returns the result to the OTAF processor 12 (broken line ae). It sends the otaspreq to the HLR 20 with the following parameter: AUTHO. The selected SSD is included only if the currently used SSD by the mobile is not yet stored in the HLR. The OTAF processor 12 knows that information since the SSD(s) are provided at the initiation of the OTAF session by the node that currently stores it.

The HLR 20 forwards the CSC Challenge Result to the OTAF processor 12 (broken line af). The OTAF processor 12 forwards the CSC Challenge Result to the MSC/VLR 18 (broken line ag) and the MSC/VLR 18 forwards the CSC Challenge Result to the mobile station 14 (broken line ah). If the SSD is not provided by the OTAF processor 12, the HLR includes the permanent SSD that is stored in the HLR record, for that mobile, based on the SSD_Select in the received request.

The mobile station 14 acknowledges the reception of the CSC Challenge Result (broken line ai). The MSC/VLR 18 forwards the CSC Challenge Result acknowledgment to the OTAF processor 12 (broken line aj).

Upon a successful CSC Challenge Result returned by the OTAF processor 12, the mobile station 14 sends the NAM Commit Response to the OTAF processor 12 using R-DATA with the following parameters: NAM Commit Result, SOC, Index Code (broken line ak). The MSC/VLR 18 forwards the NAM Commit Response to the OTAF processor 12 (broken line al). The OTAF processor 12 acknowledges the reception of the NAM Commit Response (broken line am). The MSC/VLR 18 forwards the acknowledge to the mobile station 14 (broken line an). At the end of this step the mobile station 14 has been successfully activated.

The foregoing description has been in relation to FIG. 5 and 6 illustrating the event message pattern used to complete a challenge request from mobile station 14. For the network to generate a new code lock parameter during this process, the steps as set out in FIG. 7 may be followed. It should be understood that the steps shown by broken lines 7a through 7d correspond to steps 3a to 3d of FIG. 3. Step 7a of FIG. 7 occurs sometimes between the step shown in FIG. 5 by broken line t and before the OTAF downloads the NAM to the mobile. Referring to FIG. 7, the OTAF processor 12 sends an OTASPREQ message to the HLR 20 to request a SSD_S or SSD_C to be generated. This message contains the following parameters: Action Code=GENERATE SSD, SSD_Type, MSID Type, MSID. The HLR 20 forwards at line 7b this request to the AC 22

The AC 22 generates the requested SSD and returns the generated SSD with the result of the generation to HLR 20 at line 7c and onto the OTAF processor 12 at line 7d. The AC 22 sends an otaspreq message to the HLR 20 with the following parameters: SSD_S or SSD_C, the SSD_Type, RESULT_CODE. The HLR 20 stores temporarily the new SSD(s) for that subscriber and forwards the message to the OTAF processor 12.

The OTAF processor 12 sends a SMDPP message to the MSC/VLR 18 with a Download Request that contains the new data for the mobile station, including the new SSD(s) to use in the subsequent OTAF session, using one or many SMDPP/smdpp messages to the mobile station. (broken line 7e.)

The MSC/VLR 18 forwards the Download Request to the mobile station 14 at broken line 7f. The mobile 14 acknowledges the reception of the Download Request (line 7g). The MSC/VLR 18 forwards the Download Request reception acknowledgment to the OTAF processor 12 with an empty smdpp (broken line 7h).

The mobile station 14 sends a Download Response to the OTAF processor 12 using R-DATA with the following parameter: Download Result MAP. (line 7i). The MSC/VLR 18 forwards the Download Response to the OTAF (Line 7j).

The OTAF acknowledges the reception of the Download Response (Line 7k). The MSC/VLR forwards the acknowledgment to the mobile (Line 7L).

At this stage in the process, the messaging returns to the pattern of messages described for FIG. 6.

The over the air function processor 12 stores the new SSD parameter after the last message is generated in FIG. 6. The messaging sequence used is identical to that described for FIG. 4 hereinabove.

Although preferred embodiments of the method and system of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A wireless communications network system for activating over the air (OTA) a mobile station, comprising:

an over the air processor for activating the mobile station and for receiving from the mobile station a first challenge request message of the activation that includes certain mobile station parameters and a code lock indicator, the over the air processor determining if a first code lock parameter corresponding to the code lock indicator has been received from the network and and if so, the over the air processor replacing the code lock indicator with the first code lock parameter and forwarding the first challenge request message including the certain mobile station parameters and the first code lock parameter to the an authentication center, and, in the event the over the air processor has not received the code lock parameter, the over the air processor forwarding the first challenge request message including the certain mobile station parameters and the code lock indicator to a first predetermined node in the network;

the first predetermined node upon receipt of the first challenge request message including the code lock indicator, replacing the code lock indicator with a stored code lock parameter stored in the predetermined node for the mobile station and corresponding to the code lock indicator, and the first predetermined node forwarding the first challenge request message including the certain mobile station parameters and the stored code lock parameter to the authentication center; and, the authentication center upon receipt of the first challenge request message using the certain mobile station parameters and a forwarded one of the first code lock parameter and stored code lock parameter to generate a return challenge response message and forwarding the return challenge response message to the over the air processor and onto the mobile station for validation.

2. The system of claim 1 wherein the first predetermined node is a node selected from the group consisting of the over the air processor, a home location register, the authentication center and a co-located home location register and authentication center.

3. The system of claim 1 wherein the over the air processor sends a code lock generating message to a second predetermined node in the network selected from the group consisting of the over the air processor, a home location register, the authentication center and a co-located home location register, and the second predetermined node generating a new code lock parameter for the mobile station which is downloaded to the mobile station when the over the air processor sends new programming information to the mobile station to activate the mobile station with new operating parameters.

4. The method of claim 3 wherein the over the air processor sends a commit message to the first predetermined node to store the new code lock parameter.

5. The method of claim 4 wherein the first predetermined node is a node selected from the group consisting of the over the air processor, a home location register, the authentication center and a co-located home location register and authentication center.

6. The method of claim 5 wherein the code lock indicator is a Shared Secret Data Indicator that indicates one of the parameters selected from the group consisting of Shared Secret Data Challenge (SSD_C) and Shared Secret Data Subsidy (SSD_S) to be utilized by the authentication center in the generation of the return challenge response.

7. A method for activating over the air (OTA) a mobile station in a wireless communications network including an over the air processor, and an authentication center, the method comprising the steps of:
   i) the over the air processor requesting the data configuration of the mobile station;
   ii) the mobile station making a first challenge request of the request for data configuration information and transmitting certain mobile station parameters to the over the air processor including a code lock indicator;
   iii) the over the air processor upon receipt of the first challenge request determining if a first code lock parameter corresponding to the code lock indicator has been received from the network and in the event the first code lock parameter has been received, the over the air processor replacing the code lock indicator with the first code lock parameter and forwarding the first challenge request including the certain mobile station parameters and the first code lock parameter to the authentication center, and, in the event the over the air processor has not received the code lock parameter, the over the air processor forwarding the first challenge request including the certain mobile station parameters and the code lock indicator to a first predetermined node in the network;
   iv) the first predetermined node upon receipt of the first challenge request including the code lock indicator, replacing the code lock indicator with a stored code lock parameter stored in the predetermined node for the mobile station and corresponding to the code lock indicator, and the first predetermined node forwarding the first challenge request including the certain mobile station parameters and the stored code lock parameter to the authentication center;
   v) the authentication center upon receipt of the first challenge request using the certain mobile station parameters and a forwarded one of the first code lock parameter and stored code lock parameter to generate a return challenge response and forwarding the return challenge response to the over the air processor and onto the mobile station;
   vi) the mobile station validating the return challenge request response and forwarding data configuration information to the over the air processor and,
   vii) the over the air processor sending new programming information to the mobile station to activate the mobile station with new operating parameters.

8. The method of claim 7 wherein the first predetermined node is a node selected from the group consisting of the over the air processor, a home location register, the authentication center and a co-located home location register and authentication center.

9. The method of claim 7 further including the step of the over the air processor sending a code lock generating message to a second predetermined node in the network selected from the group consisting of the over the air processor, a home location register, the authentication center and a co-located home location register, and the second predetermined node generating a new code lock parameter for the mobile station which is downloaded to the mobile station when the over the air processor sends new programming information to the mobile station to activate the mobile station with new operating parameters.

10. The method of claim 9 further including the step of the over the air processor sends a commit message to the first predetermined node to store the new code lock parameter.

11. The method of claim 10 wherein the first predetermined node is a node selected from the group consisting of the over the air processor, a home location register, the authentication center and a co-located home location register and authentication center.

12. The method of claim 11 wherein the code lock indicator is a Shared Secret Data Indicator that indicates one of the parameters selected from the group consisting of Shared Secret Data Challenge (SSD_C) and Shared Secret Data Subsidy (SSD_S) to be utilized by the authentication center in the generation of the return challenge response.

13. The method of claim 12 wherein code lock generating message instructs the second predetermined node to generate one of the parameters selected from the group consisting of Shared Secret Data Challenge (SSD_C) and Shared Secret Data Subsidy (SSD_S).

14. The method of claim 13 wherein the certain mobile station parameters further include the mobile identification number (MIN/IMSI), electronic serial number (ESN), challenge request activation code, and the service provider identity.

15. The method of claim 9 wherein the code lock indicator is a Shared Secret Data Indicator that indicates one of the parameters selected from the group consisting of Shared Secret Data Challenge (SSD_C) and Shared Secret Data Subsidy (SSD_S) to be utilized by the authentication center in the generation of the return challenge response.

16. The method of claim 15 wherein code lock generating message instructs the second predetermined node to generate one of the parameters selected from the group consisting of Shared Secret Data Challenge (SSD_C) and Shared Secret Data Subsidy (SSD_S).

17. The method of claim 7 wherein the code lock indicator is a Shared Secret Data Indicator that indicates one of the parameters selected from the group consisting of Shared Secret Data Challenge (SSD_C) and Shared Secret Data Subsidy (SSD_S) to be utilized by the authentication center in the generation of the return challenge response.

18. The method of claim 9 wherein code lock generating message instructs the second predetermined node to generate one of the parameters selected from the group consisting of Shared Secret Data Challenge (SSD_C) and Shared Secret Data Subsidy (SSD_S).

19. A method for activating over the air (OTA) a mobile station in a wireless communications network including an over the air processor, a home location register and an authentication center, the method comprising the steps of:
   i) the over the air processor requesting the data configuration of the mobile station;
   ii) the mobile station making a first challenge request of the request for data configuration information and transmitting certain mobile station parameters to the over the air processor including a code lock indicator;

iii) the over the air processor upon receipt of the first challenge request determining if a first code lock parameter corresponding to the code lock indicator has been received from the network and in the event the first code lock parameter has been received, the over the air processor replacing the code lock indicator with the first code lock parameter and forwarding the first challenge request including the certain mobile station parameters and the first code lock parameter to the home location register, and, in the event the over the air processor has not received the code lock parameter, the over the air processor forwarding the first challenge request including the certain mobile station parameters and the code lock indicator to the home location register;

iv) the home location register upon receipt of the first challenge request including the first code lock parameter forwarding the first challenge request to the authentication center, the home location register, upon receipt of the first challenge request including the code lock indicator, replacing the code lock indicator with a stored code lock parameter stored in the home location register for the mobile station and corresponding to the code lock indicator, and the home location register forwarding the first challenge request including the certain mobile station parameters and the stored code lock parameter to the authentication center;

v) the authentication center upon receipt of the first challenge request from the home location center using the certain mobile station parameters and a forwarded one of the first code lock parameter and stored code lock parameter to generate a return challenge response and forwarding the return challenge response to the over the air processor and onto the mobile station;

vi) the mobile station validating the return challenge request response and forwarding data configuration information to the over the air processor, and, vii) the over the air processor sending new programming information to the mobile station to activate the mobile station with new operating parameters.

20. The method of claim 19 wherein the code lock indicator is a Shared Secret Data Indicator that indicates one of the parameters selected from the group consisting of Shared Secret Data Challenge (SSD_C) and Shared Secret Data Subsidy (SSD_S) to be utilized by the authentication center in the generation of the return challenge response.

21. The method of claim 20 wherein the certain mobile station parameters further include the mobile identification number (MIN/IMSI), electronic serial number (ESN), challenge request activation code, and the service provider identity.

22. The method of claim 19 further including the step of the over the air processor sending a code lock generating message to the authentication center via the home location register and the authentication center in response to the code lock generating message generating a new code lock parameter for the mobile station which is downloaded to the mobile station when the over the air processor sends new programming information to the mobile station to activate the mobile station with new operating parameters.

23. The method of claim 22 further including the step of the over the air processor sending a commit message to the home location register to store the new code lock parameter.

24. The system of claim 19 wherein the step of the over the air processor sends a code lock generating message to the authentication center via the home location register and the authentication center in response to the code lock generating message generating a new code lock parameter for the mobile station which is downloaded to the mobile station when the over the air processor sends new programming information to the mobile station to activate the mobile station with new operating parameters.

25. The system of claim 24 wherein the over the air processor sends a commit message to the home location register to store the new code lock parameter generated by the authentication center.

26. An over the air activation system for use in a wireless telecommunications network, the mobile station being programmed with certain identification and operating parameters for communicating with the wireless network, the system comprising:

a mobile switching center for communicating through a base station with the mobile station;

an over the air processor for forwarding to the mobile station through the base station a first message requesting the data configuration of the mobile station and for receiving from the mobile station a first challenge message comprising certain mobile station parameters that includes a code lock indicator message identifying secret data information excluded from the first challenge message, the over the air processor determining if a first code lock parameter corresponding to the code lock indicator has been received from the network and in the event the first code lock parameter has been received, the over the air processor revising the first challenge message by replacing the code lock indicator with the first code lock parameter and forwarding the first challenge message to a home location register, and, in the event the over the air processor has not received the first code lock parameter, the over the air processor forwarding the first challenge message as received to the home location register;

the home location register upon receipt of the first challenge request message including the first code lock parameter forwarding the first challenge request message to an authentication center, and the home location register, upon receipt of the first challenge request message including the code lock indicator, replacing the code lock indicator with a stored code lock parameter stored in the home location register, and the home location register forwarding the first challenge message including the stored code lock parameter to the authentication center;

the authentication center in response to the first challenge message received from the home location register generating a return challenge request message calculated from the certain mobile station parameters and the appropriate one of the first code lock parameter and the stored code lock parameter and forwarding the return challenge request message to the over the air processor including authentication information and authorization command which is forwarded by the over the air processor to the mobile station; and, the mobile station validating the calculated return challenge request message and forwarding a data configuration information message to the over the air processor in response to the authorization command to permit the over the air processor to send new programming information to the mobile station to re-activate the mobile station with new operating parameters.

27. The system of claim 26 wherein the code lock indicator is a Shared Secret Data Indicator that indicates one of the parameters selected from the group consisting of Shared Secret Data Challenge (SSD_C) and Shared Secret Data Subsidy (SSD_S) to be utilized by the authentication center in the generation of the return challenge request message.

28. The system of claim 27 wherein the certain mobile station parameters further include the mobile identification number (MIN/IMSI), electronic serial number (ESN), challenge request activation code, and the service provider identity.

\* \* \* \* \*

UNITED STATES PATENT AND TRADEMARK OFFICE
CERTIFICATE OF CORRECTION

PATENT NO. : 6,141,544
DATED : October 31, 2000
INVENTOR(S) : Corriveau et al.

Page 1 of 1

It is certified that error appears in the above-identified patent and that said Letters Patent is hereby corrected as shown below:

<u>Column 6,</u>
Line 67, replace "$SSD_{13}Type$" with -- $SDD\_Type$ --

<u>Column 10,</u>
Line 28, replace "network and" with -- network --
Line 33, replace "to the an" with -- to an --

Signed and Sealed this

Second Day of April, 2002

Attest:

JAMES E. ROGAN
*Attesting Officer*    *Director of the United States Patent and Trademark Office*